US005308568A

United States Patent [19]

Lipp

[11] Patent Number: 5,308,568

[45] Date of Patent: May 3, 1994

[54] EXTRUSION DIE AND METHOD

[75] Inventor: G. Daniel Lipp, Painted Post, N.Y.

[73] Assignee: Corning Incorporated, Corning, N.Y.

[21] Appl. No.: 65,551

[22] Filed: May 20, 1993

[51] Int. Cl.[5] .............................................. B29C 47/12

[52] U.S. Cl. .......................... 264/177.12; 264/211.11; 419/67; 425/461; 425/462

[58] Field of Search ....................... 264/177.12, 211.11; 425/461, 464, 462, 463, 466, 467, DIG. 217; 419/67

[56] References Cited

U.S. PATENT DOCUMENTS

| | | | |
|---|---|---|---|
| 1,874,503 | 8/1932 | Greenwood | 425/463 |
| 3,983,283 | 9/1976 | Bagley | 428/116 |
| 4,243,370 | 1/1981 | Higuchi et al. | 425/462 |
| 4,731,010 | 3/1988 | Cunningham | 425/461 |
| 4,741,792 | 5/1988 | Matsuhisa et al. | 156/89 |
| 4,767,309 | 8/1988 | Mizuno et al. | 425/461 |
| 4,955,524 | 9/1990 | Way | 228/182 |

FOREIGN PATENT DOCUMENTS

| | | |
|---|---|---|
| 0294106 | 7/1982 | European Pat. Off. . |
| 50-29922 | 3/1981 | Japan . |
| 50-151849 | 2/1990 | Japan . |

*Primary Examiner*—Jan H. Silbaugh
*Assistant Examiner*—Christopher A. Fiorilla
*Attorney, Agent, or Firm*—K. van der Sterre

[57] ABSTRACT

A method and die apparatus for manufacturing a honeycomb body of triangular cell cross-section and high cell density, the die having a combination of (i) feedholes feeding slot intersections and (ii) feedholes feeding slot segments not supplied from slot intersections, whereby a reduction in feedhole count is achieved while still retaining good extrusion efficiency and extrudate uniformity.

9 Claims, 2 Drawing Sheets

EXTRUSION DIE AND METHOD

The Government of the United States of America has rights in this invention pursuant to contract No. DEN3-336 awarded by the Department of Energy.

BACKGROUND OF THE INVENTION

The present invention relates to an extrusion die for forming thin-walled honeycomb structures from extrudable materials such as glasses, glass-ceramics, ceramics, plastics, metals, cermets and other materials. In the ceramic arts, such dies are used for the extrusion of ceramics dispersed as powders in shapeable (plastic) extrusion batches to provide extruded green bodies of complex honeycomb shape.

Thin-walled ceramic honeycomb structures with multiple parallel through-channels or cells display utility in a variety of applications. For example, such structures exhibit utility as catalytic converters in the exhaust system of internal combustion engines. They also exhibit more general utility as catalyst carriers, filter bodies, and thermal regenerators or heat exchangers.

Dies used for the extrusion of ceramic honeycombs commonly have shallow, intercrossing and interconnecting slots on the downstream or exiting die face from which the ceramic batch emerges and which during emergence form the webs or sidewalls of the cells of the honeycomb structure being made. To supply the batch material to these slots, feed holes are provided in the opposite or upstream die face which connect with and feed batch material to the slots.

In common production dies the feed holes are aligned with the intersections of the slots on the outlet face of the die. This is because the intersections generally require larger proportions of the batch material for proper slot filling and web formation in the extruded shape. Some dies have a feed hole at every intersection, while other dies have holes at alternate intersections. Alternating hole patterns using fewer holes of larger diameter can be advantageous in that the dies are easier and less costly to produce, and are more resistant to bending deformation under high extrusion pressure.

Dies are also occasionally made with the feed holes aligned with the central portions of the slot segments, e.g., midway between the slot intersections. This feedhole positioning can improve the strength of the "pins", which are the projecting islands of metal bounded by the slots on the exit face of the die defining the channels in the honeycomb material extruded from the die.

Unexamined Japanese Patent Publication No. 50-151849 discloses an extrusion die having arrangement of feed holes and forming slots wherein the feed holes supply batch material principally to the longitudinal slot segments of the die rather than to the slot intersection portions. Unexamined Japanese Patent Publication No. 50-29922 describes extrusion dies for the continuous manufacture of ceramic honeycombs which comprise feed holes supplying either the slot intersections or the central portions of the slots.

A variety of die configurations for extruding honeycomb bodies of both triangular and square cell cross-section are known. U.S. Pat. No. 1,874,503, for example, discloses a triangular cell extrusion die wherein the feed holes supply batch material to the intersections of the triangular slots, this die being used for the extrusion of candy.

Dies of alternating feed hole design are also known. U.S. Pat. No. 4,741,792, for example, discloses a rectangular cell die configuration for extruding honeycomb ceramic heat exchanger bodies wherein the feed holes are positioned at alternating slot intersections. In this design, only two of the four corners of each extruded cell are formed by the direct flow of batch material thereto. The other corners of each cell are formed by lateral flow of the batch material within the slots to achieve the necessary web knitting at such other corners.

More complex arrangements of holes and slots are provided in compound dies comprising multiple body and/or face plate elements. For example, U.S. Pat. No. 4,243,370 describes a three-part honeycomb extrusion die comprising a slotted face plate, a feed hole plate, and a throttle plate, while U.S. Pat. No. 4,731,010 discloses a two-part extrusion die having a body plate and an abutting face plate, and wherein feed reservoirs for collecting and distributing batch material transmitted by the body plate are provided on the rear surface of the face plate.

Still other feed hole arrangements have been used when the honeycomb configuration of the extruded batch material is irregular. Thus published European Patent Application EP 0294106 describes extrusion dies for the manufacture of honeycomb-shaped ceramic regenerator bodies wherein feed holes of varying diameter are used to supply extrusion batch to the pin array forming the cells of the honeycomb. The variation is such that the largest feed holes supply batch material to regions of the honeycomb cross-section having the thinnest wall sections.

Notwithstanding these developments, no existing die design has proven adequate for the production of extruded honeycomb bodies of triangular cell cross-section with very high cell density. A specific problem not addressed in the prior art is that of achieving an adequate and uniform supply of extrudable batch material to a discharge slot array comprising a very large number of very fine slots. This is because, at higher and higher slot densities, more and smaller feedholes are generally required.

The principal difficulty encountered with these slot arrangements is that there is a practical minimum feedhole size, due principally to drilling technology limitations, which limits the density of the feedhole patterns available. Thus, even at minimum attainable feedhole sizes, a too close spacing of feedholes produces a weak die structure. In general, then, a feedhole pattern permitting the use of larger and/or more widely spaced feedholes provides both die fabrication and die performance advantages.

Accordingly, it is a principal object of the present invention to provide a novel extrusion die and method for using it which can produce extruded green ceramic honeycomb preforms of triangular cell cross-section and high cell density.

It is a further object of the invention to provide an extrusion die design incorporating a novel arrangement of slots and feedholes such that high-cell-density bodies with triangular cell cross-sections and thin cell walls can be efficiently produced.

It is a further object of the invention to provide an improved method for manufacturing an extruded ceramic honeycomb shape of triangular cell cross-section, high cell density, and low cell wall thickness.

Other objects of the invention will become apparent from the following description thereof.

SUMMARY OF THE INVENTION

The present invention provides an improved extrusion die design, and a method for the manufacture of honeycomb bodies using the die, which enable the production of triangular cell honeycombs with thin walls and high cell density. The improved die offers a die construction characterized by the use of larger feed holes which are fewer in number than in the traditional die. Hence, through appropriate sizing and positioning of the feed holes in the die, high quality triangular-cell honeycombs with relatively high cell density and low cell wall thickness may be provided utilizing existing feedhole drilling technology, and with a die offering good strength and rigidity.

The present invention avoids the difficulties of previous designs for the extrusion of triangular-cell honeycombs, wherein feed holes on every slot segment or every slot intersection have traditionally been used. For high cell density dies, these designs present a problem in that the feed holes, though minimally sized, must still be positioned too close to each other for good die performance.

In accordance with the present invention, a feed hole pattern is provided comprising two discrete sets of feedholes. The feedholes in one of the sets, referred to as intersection feedholes, supply extrudable material to slot intersections, with each such feedhole thus being shared or feeding all of the slot segments joining at the intersection. The other set comprises feedholes referred to as slot feedholes, positioned to supply only single slot segments. These latter segments are those segments spaced away from and thus not directly accessed by any intersection feedholes.

The feedholes making up these sets are arranged in an alternating pattern with the intersection feedholes being separated from each other and surrounded by slot feedholes, as hereinafter more fully described.

The preferred die design uses a conventional triangular slot pattern formed by three sets of parallel slots, each set intersecting with the other two sets at predetermined offset angles. For example, to provide slots forming equilateral triangles, offset angles of 60° for the sets may be used. This slot pattern typically produces an array of equilateral triangular pins bounded by the intersecting slots.

In accordance with the invention the feedhole pattern for this slot array comprises a first set of intersection feedholes and a second set of slot feedholes. The intersection feedholes are located at spaced selected three-slot intersection points, it being apparent from this placement that each such feedhole is located at the shared apex of six triangles having their apexes formed by segments of the three intersecting slots.

Associated with each of the intersection feedholes in the feedhole pattern are six slot feedholes. These slot feedholes are located on the sides (bases) of each of the six triangles opposite the shared apex point at which the intersection feedhole for the triangles is located. Thus each triangular pin in the six triangle array is bounded by a base slot, supplied by a slot feedhole, and a pair of intersecting side slots, supplied by the intersection feed hole at the apex or intersection of the side slots.

Additional intersection and slot feedholes complete the feedhole pattern, these being positioned such that each intersection feedhole is surrounded by six slot feedholes, and each slot feedhole is positioned between two intersection or apex feedholes. Thus, although there are two discrete families of feedholes, all pins have the same shape and the same extrudable material supply pattern.

In a first aspect, then, the present invention includes a novel extrusion die for extruding a honeycomb body. As is conventional, the die incorporates a feedhole portion bounded by an inlet face and a discharge slot portion bounded by an outlet face. The feedhole portion comprises multiple feedholes open at the inlet face and the discharge slot portion comprises multiple discharge slots communicating with the feedholes and open at the outlet face, so that a flow path for the passage of an extrudable material through the die from the inlet face to the outlet face is provided.

The discharge slot pattern of the die, being designed for the extrusion of honeycomb bodies with multiple cells of triangular cross-section, arises from an array of criss-crossing slots on the outlet face of the die, configured to form an array of connected triangles. Each such triangle is thus formed of or bounded by three intersecting slot segments.

Finally, and characteristic of the die of the invention, the feedhole array employed to supply extrudable material to the discharge slots comprises both intersection feedholes and slot feedholes. These are disposed so that, for each triangle on the outlet face of the die, a feedhole positioned at an intersection of two of the slot segments communicates with and provides the source of extrudable material for those two segments, and a single feedhole, communicating with and preferably positioned substantially centrally of the remaining or third slot segment, provides extrudable material for that third segment.

It can be seen from this arrangement that the supply of extrudable material for each triangular cell of the die is a feedhole pair rather than three or more feedholes. This reduces the average number of feedholes per cell in extruded honeycomb bodies provided by the die.

In another aspect the present invention includes a method for manufacturing a honeycomb body of triangular cell cross-section by the extrusion or discharge of an extrudable material through an extrusion die such as above described. As noted, the outlet face of the die comprises an array of criss-crossing intersecting discharge slots, the intersecting slots forming slot segments between intersections which connect to form connected triangles. With this arrangement, the die can operate to extrude a unitary honeycomb body incorporating multiple connected triangular cells having intersecting cell walls extruded by the intersecting slot segments.

The characteristic feature of the method using the die described is that extrudable material for two cell walls of each of the triangular cell in the extruded body is supplied predominantly through a shared feedhole communicating with the common end of the two slot segments extruding the two walls. Further, the extrudable material for the third wall is supplied predominantly through a single feedhole communicating directly with the slot segment extruding the third wall and preferably located more or less centrally of that slot.

Advantageously, the shared or intersection feedhole providing extrudable material to the slot segment intersections in accordance with the above method will typically supply extrudable material to a total of six slot segments in the preferred design. This results in a significant reduction in the number of feedholes used in the method and permits the use of larger and more easily drilled feedholes.

DESCRIPTION OF THE DRAWING

The invention may be further understood by reference to the drawings, wherein.

DETAILED DESCRIPTION

Dies provided in accordance with the invention may be fabricated of any of the known materials useful for such apparatus. Typically, such dies are formed of carbon steel, stainless steel alloys, or similar strong and tough metals. The particular material selected will of course depend upon the cell density and number of feed holes required, as well as on the rheology of the extrudable material to be extruded. Thus metals or even nonmetals of lesser strength and/or toughness may be useful for some applications. As is conventional, these dies may be of one piece construction, including a slotted front portion integral with a communicating rear feedhole portion, or they may be fabricated of two or more plate or block components each forming a selected portion of the die.

The machining of feed holes and slots in dies of this design may be accomplished by conventional techniques, to be employed according to the particular material selected for constructing the die. As is well known, conventional drilling and slotting methods may be used for easily machineable metal die components of carbon steel, brass or other metals, while electrochemical machining techniques such as electrical discharge machining or the like may be preferred for hard steel alloys or other more brittle metallic or ceramic materials.

The dies and extrusion methods of the invention are useful for the extrusion of a variety of extrudable materials, but have principal application for the manufacture of inorganic honeycomb bodies from plastic batches of powdered metal, ceramic, or other inorganic materials at ambient or near-ambient extrusion temperatures. Thus, for example, extrusion batches formed of metal powders or powders of ceramic materials in combination with suitable binders and extrusion aides can be shaped into honeycomb green bodies using these dies. The resulting green bodies can then be processed by heating to cure or remove organic binders, typically at temperatures sufficient to sinter or otherwise consolidate the powders into durable integral honeycomb products.

Depending upon the particular materials to be extruded by the die, wear coatings or coatings to improve the lubricity of the feed hole and slot walls of these dies may be applied subsequent to the machining of the die. Examples of such coatings include electroless nickel plating layers and vapor-deposited carbide, nitride and/or boride coatings.

Figure 1:
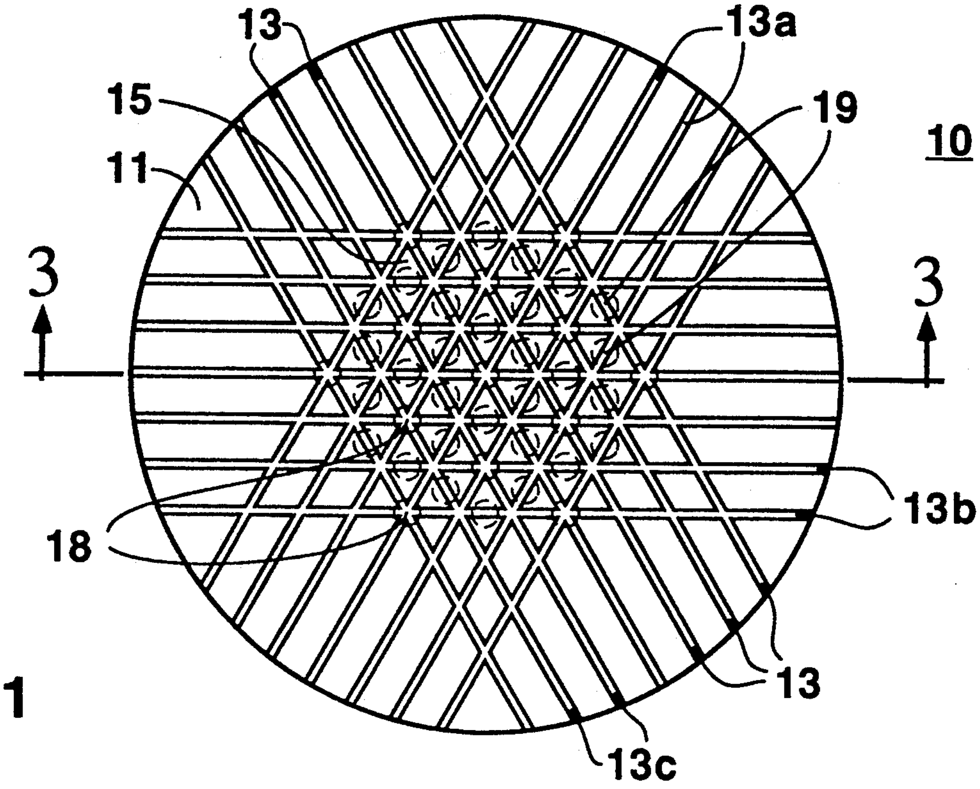
FIG. 1 is a schematic top plan view of the outlet or slotted face of a die according to the invention.
Figure 2:
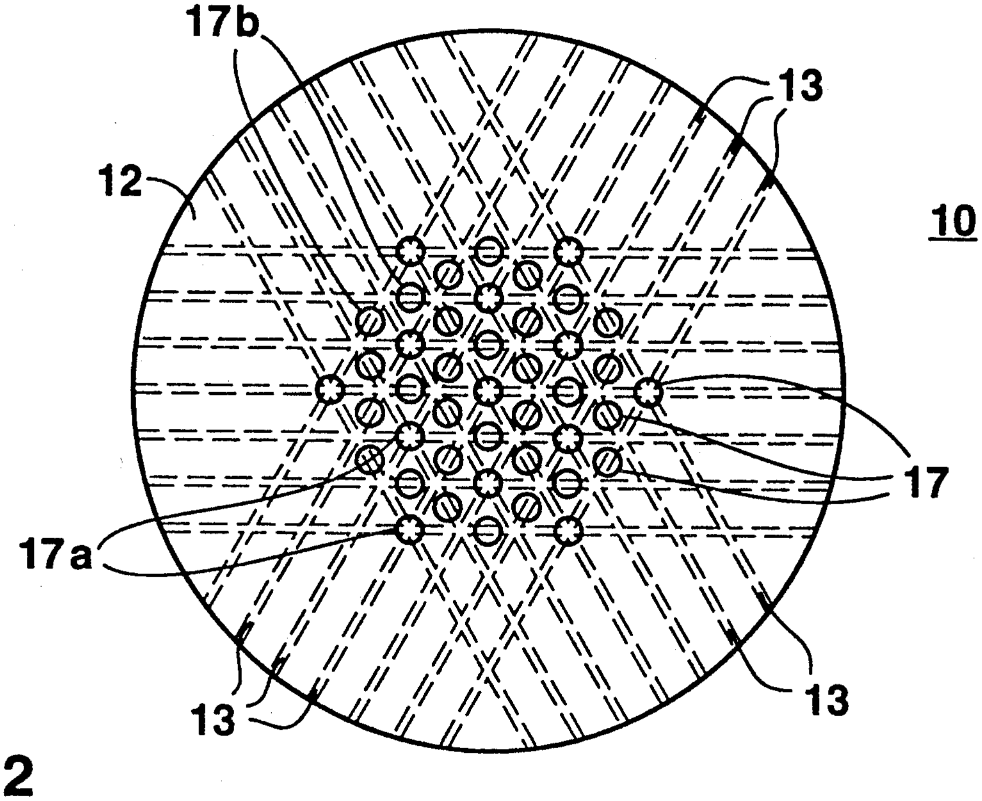
FIG. 2 is a schematic top plan view of the inlet or feedhole face of the die of FIG. 1.
Figure 3:
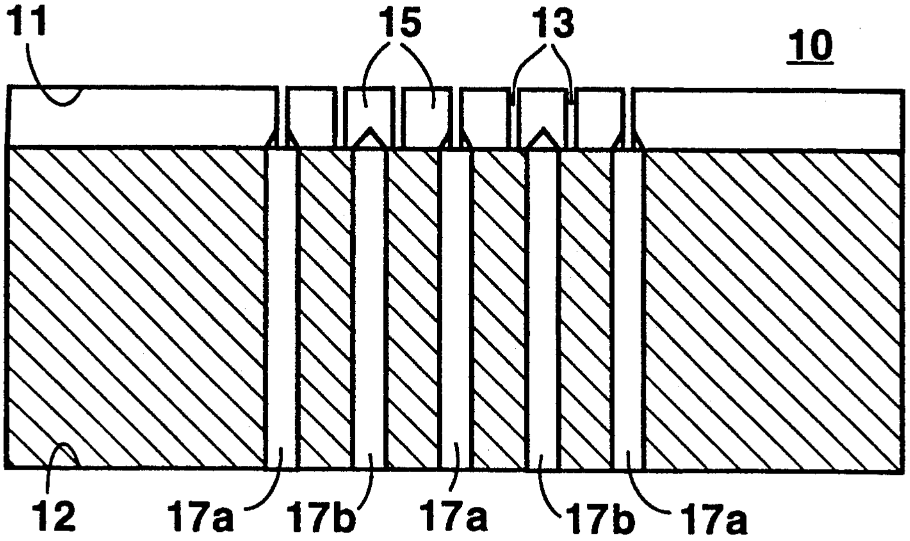
FIG. 3 is a schematic elevational view of the die of FIG. 1 shown along line 2—2.
Figure 4:
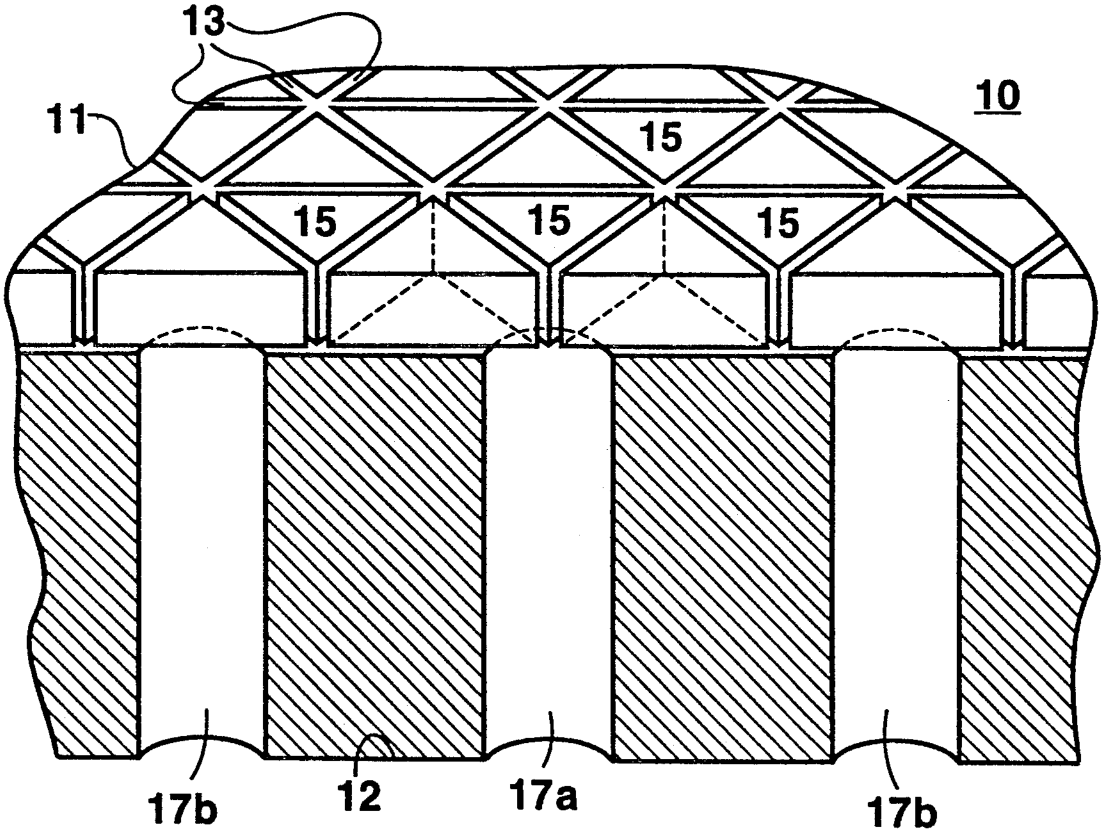
FIG. 4 is a partial schematic three-dimensional view of the die of FIG. 1.

An example of the structure of an extrusion die provided in accordance with the invention is provided in FIGS. 1-4 of the drawing, those Figures showing various views of a die 10 and wherein like reference numerals refer to the same features of the die in each of the four views. FIGS. 1 and 2 show, respectively, plan views of the top and bottom of die 10, the top view of FIG. 1 showing the slotted outlet face 11 and the bottom view of FIG. 2 showing the inlet face 12 of the die. FIG. 3 provides a schematic elevational view of die 10 as seen along line 3—3 of FIG. 1, and FIG. 4 is an enlarged partial schematic three-dimensional view of the die in cross-section, illustrating the relative positioning of the slots and feedholes therein.

As shown in the various Figures, the outlet face 11 of the die is provided with a plurality of interconnected, crisscross discharge slots represented by slots 13, all slots extending inwardly from the outlet face 11. These form three parallel arrays of slots, each array being angularly offset from the other two arrays by 60°.

Pairs of discharge slots in each array (e.g. slot pair 13*a* in FIG. 1), when crisscrossed by slot pairs from the other two angularly offset discharge slot arrays (e.g., slot pairs 13*b* and 13*c* in FIG. 1), form a multiplicity of triangular core members or pins represented by pin 15 (and pins 15 in FIGS. 3 and 4) which extend inwardly from the outlet face 11 of the die toward the inlet face 12. Conversely, the slots 13 can be viewed as being defined by the triangular configuration and arrayed positioning of the pins 15.

The slots 13 are in communication with and therefore fed with extrudable material by a plurality of feed holes, represented generally by feedholes 17 in FIG. 2. As shown in FIGS. 2, 3 and 4, feedholes 17 include two feedhole subsets: intersection feedholes represented by feedholes 17*a* and slot feedholes represented by feedholes 17*b*. All of these holes originate at the inlet face 12 of the die, and each hole directly connects with and preferably overlaps the bottom ends of the slots 13, as best seen in FIG. 3.

While the slots 13 are all shown of equivalent width, the width of each of the slots or sets of slots may of course be varied to provide walls of differing thickness in an extruded body, as may be selected to accommodate the requirements of the particular application for which the extruded body is intended.

In the feedhole arrangement utilized to supply the slots, intersection feedholes such as 17*a* in FIGS. 2, 3 and 4 supply extrudable material primarily to alternate slot intersections, as represented by intersections 18 in FIG. 1. Each feedhole in slot intersection positions such as 18 thus supplies extrudable material to six slot segments radiating therefrom.

Each of the slot feedholes such as feedholes 17*b* shown in FIGS. 2, 3 and 4 supplies extrudable material principally to only a single associated slot segment, such associated slot segments being illustrated by slot segments 19 in FIG. 1. Considering the grouping of the slot feedholes, it can be seen from FIG. 2. that the slot feedholes are positioned in hexagonal arrays around each intersection feedhole 17*a*, at least at all portions of the feedhole pattern away from the edges of the pattern. Viewed in another way, the slot segments fed by feedholes such as 17*b* form the bases of triangular cells having apexes on intersection feedholes such as feedholes 17*a*, the base slot segments not being directly accessed by the latter feedhole.

From the standpoint of the alternate spacing of intersection and slot feedholes on full lengths of the long slots, it can be seen from FIG. 2 that, on each long slot 13 in the slot array making up the discharge slot pattern of the die, each intersection feedhole 17*a* is separated from the next adjacent intersection feedhole by (i) two intervening slot intersections not fed by feedholes, and (ii) a slot feedhole positioned between the two intervening slot intersections.

EXAMPLE

To fabricate an extrusion die having a design such as shown in FIGS. 1-4 of the drawing, a plate of carbon steel to serve as a die body, having a thickness of about 1.2 inches (30 mm), is first selected. This steel is suitably formed of Freemax 15 carbon steel, an easily machineable steel which is commercially available from Buell Specialty Steel Co. of Rochester, N.Y., USA.

Into one face of the steel plate, i.e., the face which is selected to serve as the discharge or outlet face of the die, three arrays or sets of parallel discharge slots are machined. These slots are machined by sawing, and have a width of about 0.010 inches (0.25 mm), a slot spacing of about 0.09306 inches (2.36 mm), and a depth of about 0.105 inches (2.67 mm).

To provide supply means for the discharge slots thus created, multiple feedholes are provided in the face of the plate opposite the slotted face (the inlet face). These are formed by gun-drilling the plate to produce multiple feedholes about 0.054 inches (1.37 mm) in diameter and 1.1 inches (27.94 mm) in depth. This depth is sufficient to insure that the feedholes will overlap and extend into the slotted region on the discharge face of the die.

The feedholes thus provided are spaced and positioned to intersect slot segments and slot intersections as shown in FIGS. 1-2 of the drawing. In this arrangement, each slot in the discharge slot array is provided with both intersection feedholes and slot feedholes, these being provided in alternating sequence. Moreover, the spacing of the feedholes on the slot is such that each slot segment, i.e., each slot section between adjacent slot intersections, connects directly with one and only one feedhole. This will be either intersection feedhole positioned more or less centrally of the segment or an intersection feedhole positioned at one or the other of the ends of the segment.

A substantial advantage of the feed hole and slot arrangement provided in this representative die resides in the fact that a significant reduction in the number of feedholes required to achieve the uniform extrusion of plastic extrudable material from the die is achieved without sacrificing the uniform extrusion characteristics of the die. Hence, the traditional feedhole approach provided the equivalent of one feed hole for each slot segment or web of the extruded body. In the dies of the invention, on the other hand, each slot feedhole provides material for one web but each intersection feedhole alternating therewith supplies extrudable material for forming the equivalent of 6 webs.

The die of this Example exhibits excellent extrusion characteristics for the extrusion of ceramic batches comprising mineral batch ingredients with appropriate vehicle components and extrusion aides. For example, a batch composition made up of about 40% talc, 46% kaolin clays, and 14% alumina by weight, and further including a vehicle comprised of about 32 parts water, 3 parts Methocel™ methyl cellulose binder, and 0.75 parts lubricant by weight for each 100 parts of the talc-clay-alumina mixture, may be uniformly extruded through the die at extrusion pressures on the order of 1600 psi to provide a green honeycomb body substantially free of distortion. This green honeycomb can then be dried and sintered to provide a thin-walled ceramic honeycomb of triangular cell cross-section and high cell density.

As a consequence of the alternating feedhole pattern provided in this die, uniform extrusion characteristics can be achieved using only one feedhole for every 2.25 webs, instead of one feedhole for every 1 web as in the prior art. The beneficial effect of this reduction in feedhole count is a stiffer die structure which is substantially more resistant to deformation or breakage under high extrusion pressure than prior art dies of high cell density.

In the particular die embodiment above described, all feedholes are of equal diameter and will extend into the slots an equal distance. Of course, if desired, the feedholes on slot intersections may be made larger in diameter and/or may be extend farther into the slots than the feedholes on the slot segments. These changes could compensate for the fact that each intersection feedhole supplies extrudable material to six slots, while each slot feedhole supplies extrudable material to only one slot.

Although the invention has been particularly described above with respect to specific examples of materials, apparatus and/or procedures, it will be recognized that these examples are presented for purposes of illustration only and are not intended to be limiting. Thus numerous modifications and variations upon the materials, processes and apparatus specifically described herein may be resorted to by those skilled in the art within the scope of the appended claims.

I claim:

1. An extrusion die for extruding a honeycomb body, the die incorporating a feedhole portion bounded by an inlet face and a discharge slot portion bounded by an outlet face, the feedhole portion comprising multiple feedholes open at the inlet face and the discharge slot portion comprising multiple discharge slots communicating with the feedholes and open at the outlet face, wherein:

the discharge slots criss-cross on the outlet face to form an array of adjoining triangles, each triangle being bounded by three intersecting slot segments, and wherein each triangle communicates directly with two feedholes, a shared feedhole which communicates with two of the slot segments at the intersection thereof and a single feedhole which communicates with the third slot segment at a location substantially centrally of the length thereof.

2. An extrusion die formed of a die body incorporating a feed hole portion bounded by an inlet face and a discharge slot portion bounded by an outlet face, the discharge slot portion comprising a criss-cross array of discharge slots open to the outlet face, the slots extending into the die body toward the inlet face and intersecting with each other to form a plurality of triangular pins, each pin with vertices at slot intersections and sides on slot segments, such that a cell of triangular cross-section may be formed in extrudable material discharged from the intersecting slot segments circumscribing each pin, the feed hole portion comprising a plurality of feed holes extending into the die body toward the outlet face for supplying extrudable material thereto, each feed hole being open to the inlet face and communicating with one or more discharge slots in the discharge slot portion, the feed holes comprising intersection feedholes communicating with slot intersections and slot feedholes communicating with slot segments between the slot intersections, the slot feedholes being arrayed alternately with the intersection feedholes such that, for each triangular pin, the slots on two of the sides communicate directly with a shared intersection feedhole and no slot feedholes, and the slot on the third side communicates directly with a slot feedhole and no intersection feedholes.

3. An extrusion die in accordance with claim 2 which is fabricated of a metal.

4. An extrusion die in accordance with claim 3 which is formed of a metal selected from the group consisting of carbon steel and steel alloys.

5. An extrusion die in accordance with claim 4 which is of one-piece construction.

6. An extrusion die in accordance with claim 5 which incorporates a wear coating selected from the group consisting of nickel, metal carbide, metal nitride and metal carbo-nitride.

7. A method for manufacturing a honeycomb body of triangular cell cross-section by discharging extrudable material through an array of criss-crossing intersecting discharge slots in an outlet face of a honeycomb extrusion die, the intersecting slots forming slot segments between intersections which connect to form connected triangles and which are operative to extrude a unitary honeycomb body incorporating multiple connected triangular cells having intersecting cell walls extruded by the slot segments, wherein:

for each triangular cell, extrudable material for two cell walls is supplied predominantly through a shared feedhole communicating with the common end of two of the slot segments extruding the two walls, and extrudable material for the third wall is supplied predominantly through a single feedhole communicating centrally with the slot segment extruding the third wall.

8. A method in accordance with claim 7 wherein the extrudable material comprises a powdered metal or a powder of a ceramic material.

9. A method in accordance with claim 8 wherein the extrudable material is a ceramic batch material comprising at least one powdered ceramic material and a vehicle for the powdered ceramic material.

* * * * *